United States Patent
Lin (10) Patent No.: US 10,470,601 B2
(45) Date of Patent: Nov. 12, 2019

(54) TEA DRINK PREPARATION METHOD

(71) Applicant: GUEN LUNG TUAN CO., LTD., Taipei (TW)

(72) Inventor: Chien-Hung Lin, Taipei (TW)

(73) Assignee: GUEN LUNG TUAN CO., LTD., Taipei (TW)

( * ) Notice: Subject to any disclaimer, the term of this patent is extended or adjusted under 35 U.S.C. 154(b) by 324 days.

(21) Appl. No.: 15/342,441

(22) Filed: Nov. 3, 2016

(65) Prior Publication Data

US 2017/0143155 A1    May 25, 2017

(30) Foreign Application Priority Data

Nov. 24, 2015   (TW) .............................. 104138978 A (51) Int. Cl.
  *A47J 31/00*    (2006.01)
  *A23F 3/18*    (2006.01)

(52) U.S. Cl.
  CPC .............. *A47J 31/002* (2013.01); *A23F 3/18* (2013.01)

(58) Field of Classification Search
  CPC .................................. A47J 31/002; A23F 3/18
  See application file for complete search history.

(56) References Cited

U.S. PATENT DOCUMENTS

| 5,207,149 A * | 5/1993 | Weber ..................... A47J 31/46 137/595 |
| 8,623,441 B2 * | 1/2014 | McLaughlin ....... A47J 31/3614 426/231 |
| 2004/0216615 A1 * | 11/2004 | Rava .................... B67D 1/0004 99/275 |
| 2009/0246341 A1 * | 10/2009 | Pitner ...................... A23F 3/16 426/435 |
| 2015/0122688 A1 * | 5/2015 | Dias .................... A47G 19/025 206/459.1 |
| 2018/0263403 A1 * | 9/2018 | Richardson ......... A47J 31/0626 |

FOREIGN PATENT DOCUMENTS

| CN | 204500365 | * | 7/2015 |
| JP | 2007202943 | * | 8/2007 |

OTHER PUBLICATIONS

English Translation of CN204500365 published Jul. 2015.*
English Translation of JP2007202943 published Aug. 2007.*

* cited by examiner

*Primary Examiner* — Anthony J Weier
(74) *Attorney, Agent, or Firm* — Muncy, Geissler, Olds & Lowe, P.C.

(57) ABSTRACT

A tea drink preparation method for preparing a cold tea drink by: using high temperature and high pressure brewing machine to brew a powdered tea so as to make a hot tea drink, and then using a beverage cooling device to cool down the hot tea drink so as to obtain a cold tea drink, and then using a vessel to take the cold tea drink for service. Thus, this method shortens the contact time between the hot tea drink and the air and reduces the risk of tea drink contamination, avoiding deterioration in color and flavor due to oxidation and maintaining good tea drink hygiene.

10 Claims, 8 Drawing Sheets

TEA DRINK PREPARATION METHOD

This application claims the priority benefit of Taiwan patent application number 104138978, filed on Nov. 24, 2015.

BACKGROUND OF THE INVENTION

1. Field of the Invention:

The present invention relates to tea and drink technology and more particularly, to a tea drink preparation method, which uses a high temperature and high pressure brewing machine to make a hot tea drink and a beverage cooling device to cool down the tea drink, thus, shortening the contact time between the hot tea drink and the air, reducing the risk of tea drink contamination, avoiding deterioration in color and flavor and maintaining good tea drink hygiene.

2. Description of the Related Art:

The kind of tea drinks can be quite complicated, green tea black tea, oolong tea can be called tea beverages. However, no matter what kind of tea brewing tea drink, the tea leaves must be brewed with hot water so that the tea flavor can be completely integrated in the hot water, making the tea to exude a unique flavor, achieving the effect of helping produce saliva and slake thirst.

Today, there are lots of beverage shops on the market, while tea beverages are the most important selling goods in hand drink shops. However, due to the greenhouse effect, the earth's surface is gradually getting warmer and the weather is getting hotter, beverage shops keep selling ice tea drinks for clients, helping clients cool down and release heat.

Today's beverage shop's cold tea drink selling is performed by: brewing tea leaves with hot water to make a hot tea drink, and then cooling the hot tea drink to room temperature, and then using a cup to pick up the tea drink and adding ice blocks to the tea drink in the cup for giving to the client who ordered the tea drink. There are commercial cold tea drink making machines that have a beverage refrigerating container therein for refrigerating brewed hot tea drink. Thus, the worker can pick up the cold tea drink from the beverage refrigerating container for selling to individual clients.

Further, according to conventional cold tea drink preparation techniques, it takes a long period of time to cool down the brewed hot water drink before service. These techniques cannot cool down the brewed hot water drink within a short time. However, a long contact time between the hot tea drink and the air during the cooling step increases the risk of tea drink contamination and can cause oxidation, resulting in deterioration in tea drink color and flavor. Further, long period contact between the hot tea drink and the air also increases the risk of exposure to external contaminants (such as E. coli), making the tea drink unable to maintain good hygiene. A consumer drinking a contaminated tea drink is easily prone to abdominal pain, diarrhea or even food poisoning.

Further, most beverage shops will add ice blocks to cool down a tea drink. When the ice blocks melt, the ice blocks will be converted from solid into liquid water that is then mixed with the tea drink, resulting in the loss of the original fresh tea drink flavor and taste and making the tea drink turbid, and even affecting the consumer's mood of drinking the tea drink. Thus, this preparation method cannot stimulate consumers' desire to repurchase the tea drink. Further, because ice blocks are normally provided by others. Further, ice blocks can easily be contaminated by outside pollutants during preparation or delivery. Thus, adding ice blocks to cool down a tea drink greatly increase the risk of tea drink contamination, making it difficult to maintain good tea drink hygiene.

SUMMARY OF THE INVENTION

The present invention has been accomplished under the circumstances in view. It is therefore the main object of the present invention to provide a tea drink preparation method, which achieves preparation of a cold tea drink by: using high temperature and high pressure brewing machine to brew a powdered tea so as to make a hot tea drink, and then using, a beverage cooling device to cool down the hot tea drink so as to obtain a cold tea drink, and then using a vessel to take the cold tea drink for service. Thus, this method shortens the contact time between the hot tea drink and the air and reduces the risk of tea drink contamination, avoiding deterioration in color and flavor due to oxidation and maintaining good tea drink hygiene.

Further, using the beverage cooling device to perform the process of heat exchange between the hot tea drink and the cooling medium does not need to add a large amount of ice blocks to the hot tea drink, avoiding taste fading or flavor deterioration. Further, ice blocks can easily be contaminated by outside pollutants during preparation or delivery. Therefore, using the beverage cooling device to cool down the hot tea drink reduces the risk of tea drink contamination, and thus, good tea drink hygiene can be maintained.

Further, the powdered tea has a small average particle size. When brewing the powdered tea in the high temperature and high pressure brewing machine to make a hot tea drink at a high temperature and a high pressure, the large contact surface area between the powdered tea and hot water enables of the internal substances of the powdered tea to be fully and rapidly released, and thus, a small amount of the powdered tea can make a large volume of hot tea drink.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
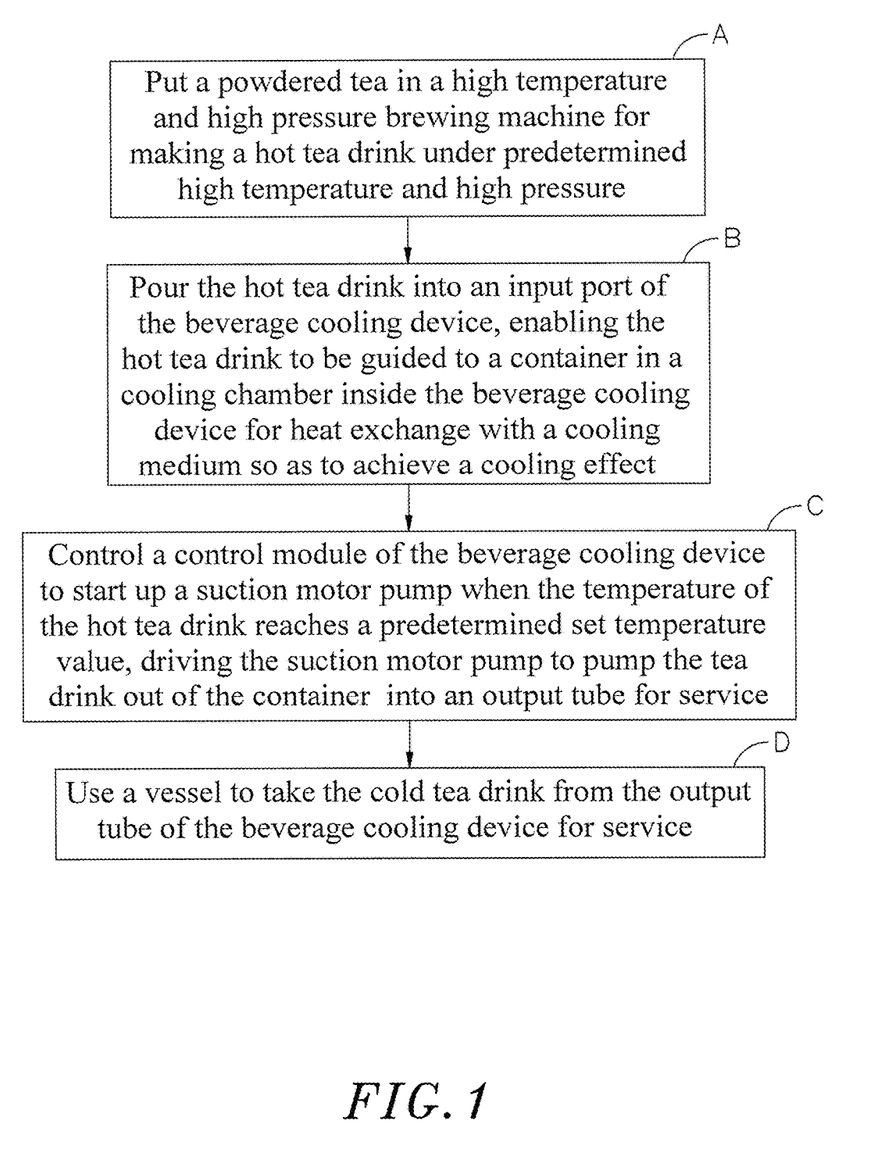
FIG. 1 is a flow chart of a tea drink preparation method in accordance with the present invention.
Figure 2:
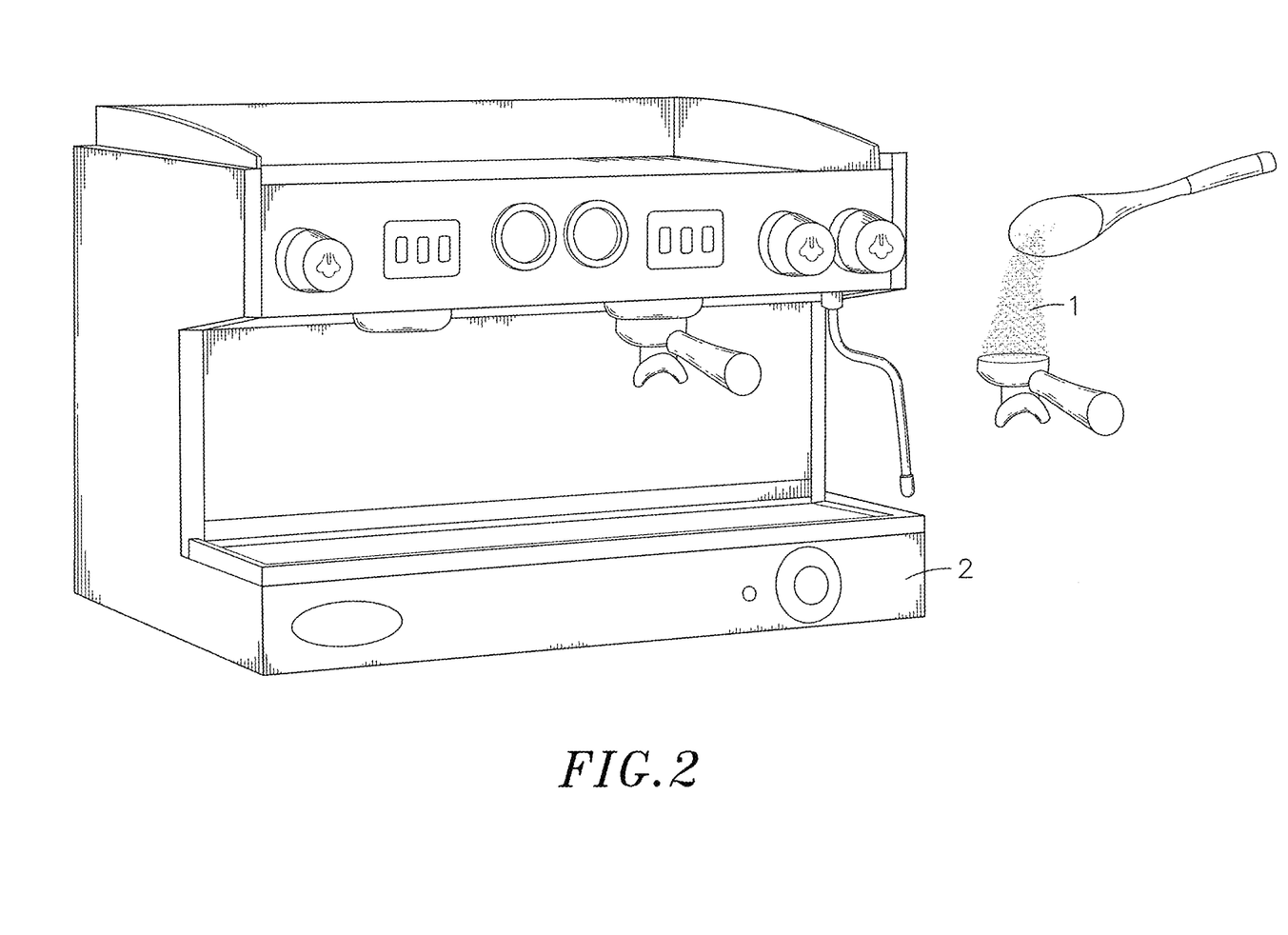
FIG. 2 is an oblique elevational view of a high temperature and high pressure brewing machine used in the tea drink preparation method in accordance with the present invention (I).

Referring to FIGS. 1-6, a tea drink preparation method in accordance with the present invention is shown. The tea drink preparation method comprising the steps of:

(A) Put a powdered tea 1 (green tea, black tea, oolong tea, etc.) in a high temperature and high pressure brewing machine 2 and then turn on the high temperature and high pressure brewing machine 2 to brew the powdered tea 1 with hot water for making a hot tea drink under a predetermined high temperature and a predetermined high pressure, enabling the hot tea drink to be held in a vessel.

Figure 4:
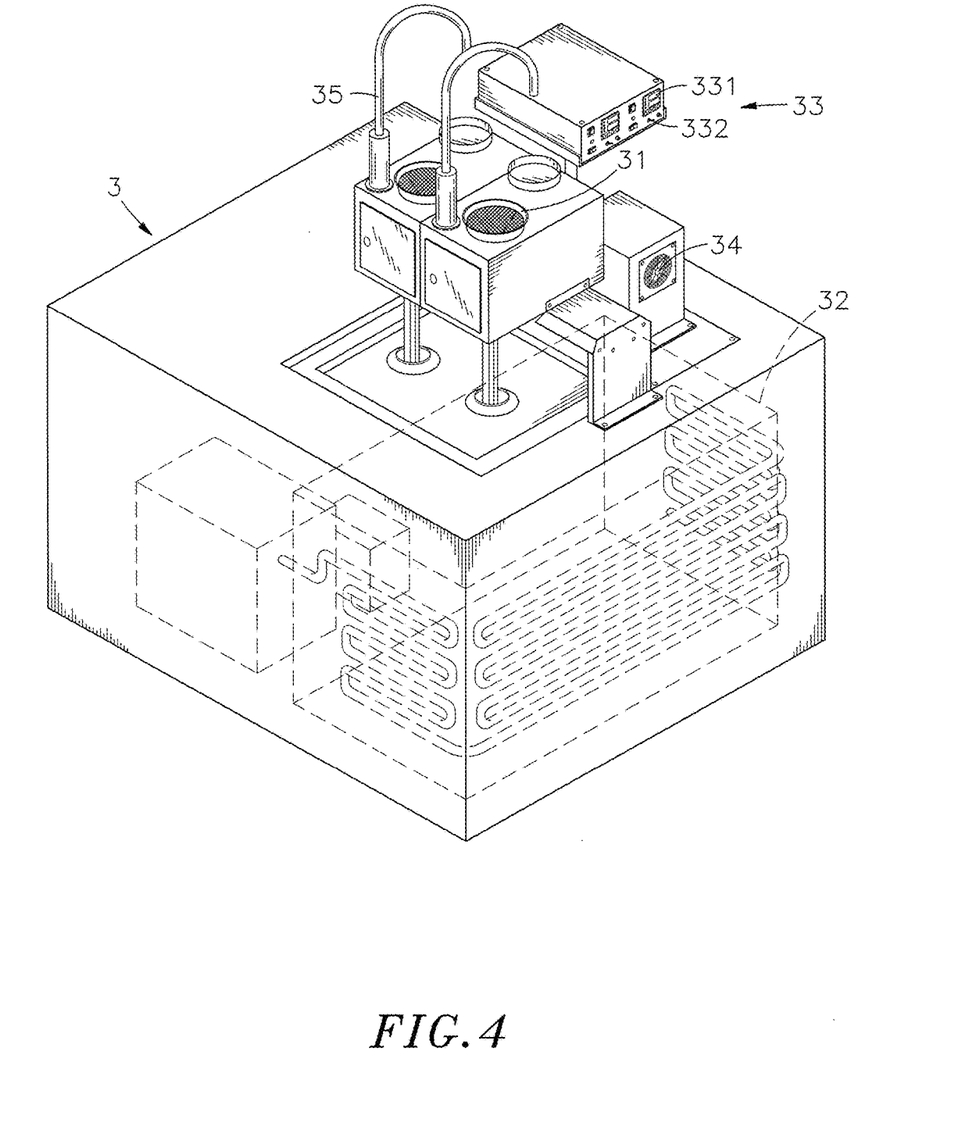
FIG. 4 is a perspective view of a beverage cooling device used in the tea drink preparation method in accordance with the present invention.
Figure 5:
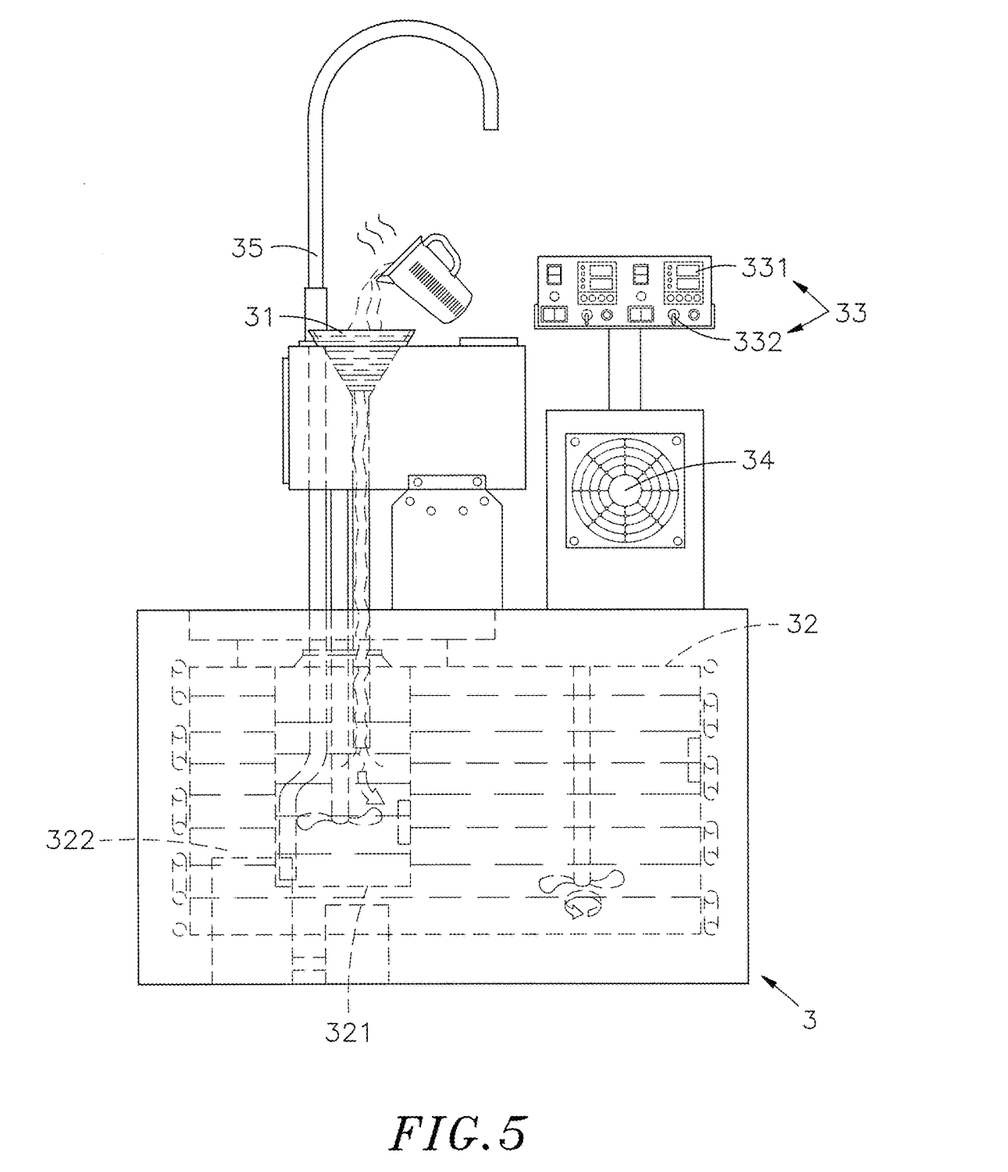
FIG. 5 is a schematic drawing illustrating an operation status of the beverage cooling device shown in FIG. 4 (I).

(B) Pour the hot tea drink out of the vessel into an input port 31 at a top side of a beverage cooling device 3, enabling the hot tea drink to be guided from the input port 31 to a container 321 in a cooling chamber 32 inside the beverage cooling device 3 for heat exchange with a cooling medium 322 in the cooling chamber 32 around the container 321 so as to achieve a cooling effect.

Figure 6:
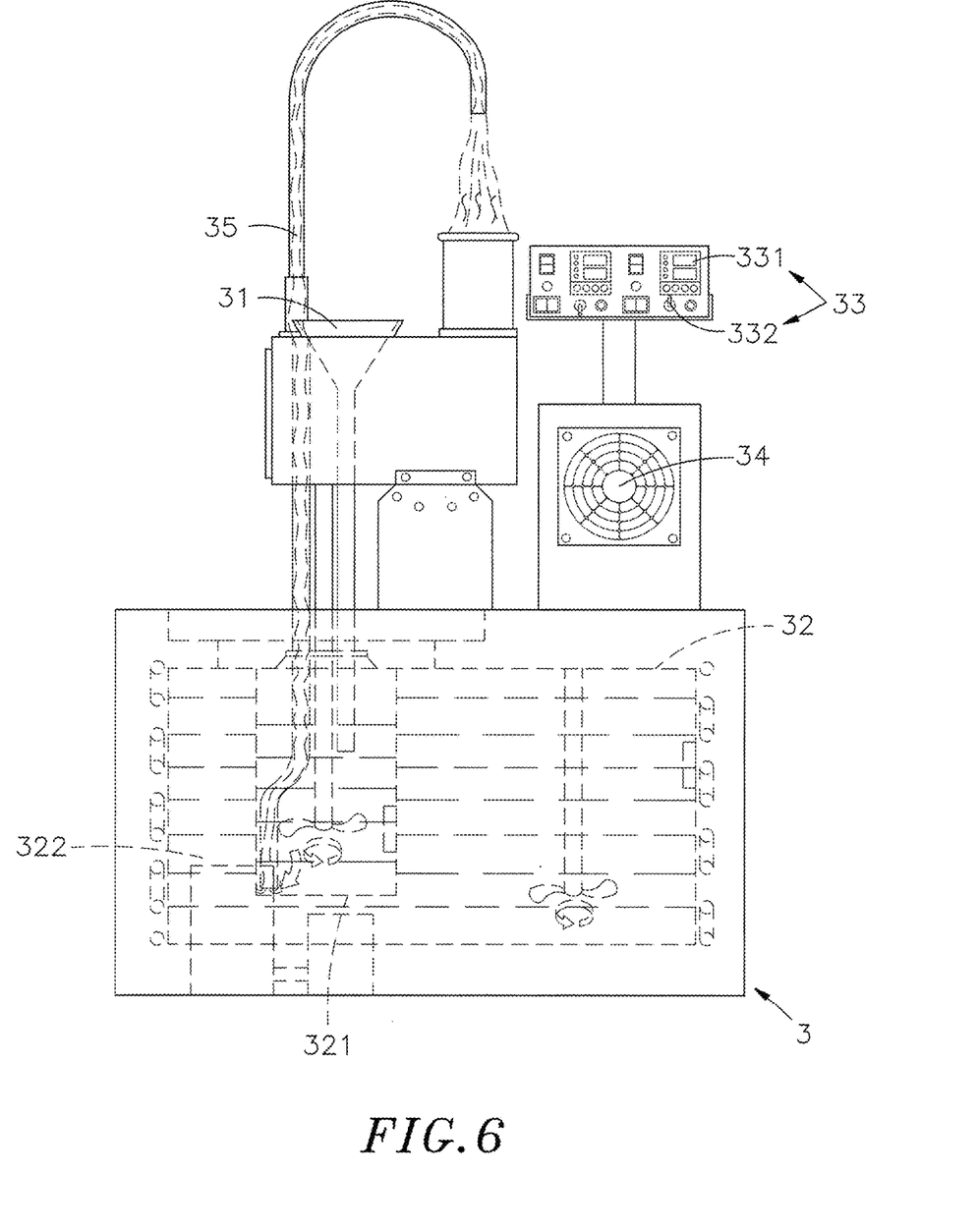
FIG. 6 is a schematic drawing illustrating an operation status of the beverage cooling device shown in FIG. 4 (II).

(C) Thereafter, the operator watches the display of a display panel 331 of a control module 33 of the beverage cooling device 3 to visually check the temperature of the tea drink in the container 321, and then switch on a switch 332 of the control module 33 to start up a suction motor pump 34 when the displayed temperature reaches a predetermined set temperature value, driving the suction motor pump 34 to pump the tea drink out of the container 321 into an output tube 35 for service.

(D) At final, the operator uses a vessel to take the cold tea drink from the output tube 35 of the beverage cooling device 3, and then switch off the switch 332 of the control module 33 to complete the tea drink preparation procedure.

Further, in step (A), the predetermined high temperature is preferably in the range of 101° C.~115° C., or most preferably at 105° C.; in step (C), the predetermined set temperature value is in the range of 20° C.~10° C., preferably in the range of 15° C. or 10° C.~2° C., or most preferably at 5° C.

Figure 3:
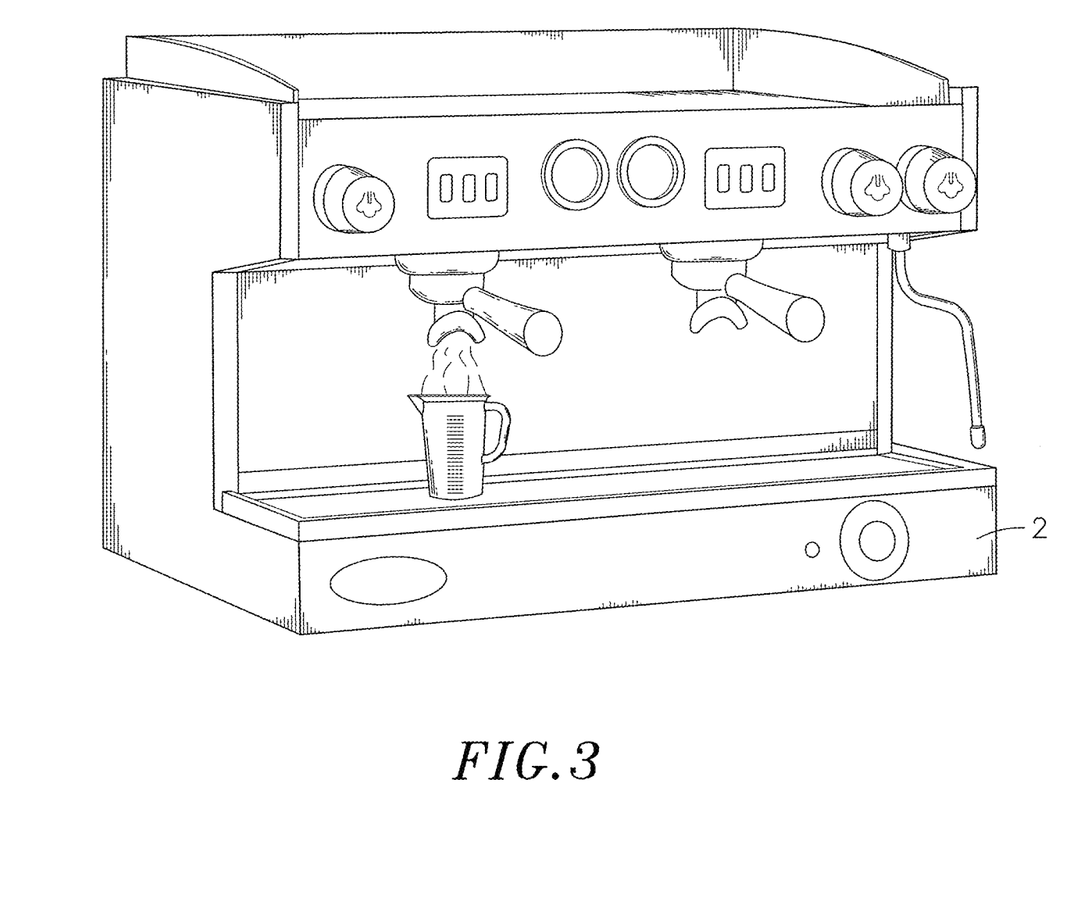
FIG. 3 is an oblique elevational view of a high temperature and high pressure brewing machine used in the tea drink preparation method in accordance with the present invention (II).

However, with respect to the technique how the high temperature and high pressure brewing machine 2 and the beverage cooling device 3 brew hot tea drink and cool down hot tea drink to cold tea drink, as the details of this technique are of the known art and not within the scope of the present invention, it is not considered necessary to repeat them herein.

The invention is to put a powdered tea 1 in a high temperature and high pressure brewing machine 2, enabling the powdered tea 1 to be brewed with hot water to make a hot tea drink under a predetermined high temperature and a predetermined high pressure. The hot tea drink is then cooled down by the beverage cooling device 3 to become a cold tea drink. Using the beverage cooling device 3 to cool down the hot tea drink greatly shortens the contact time between the hot tea drink and the air, avoiding deterioration in color and flavor due to oxidation caused by long period contact between the hot tea drink and the air and reducing the risk of exposure to external contaminants (such as *E. coli*). Thus, good tea drink hygiene is maintained.

Further, using the beverage cooling device 3 to perform the process of heat exchange between the hot tea drink and the cooling medium does not need to add a large amount of ice blocks to the hot tea drink, avoiding taste fading or flavor deterioration. Further, ice blocks can easily be contaminated by outside pollutants during preparation or delivery. Therefore, using the beverage cooling device 3 to cool down the hot tea drink reduces the risk of tea drink contamination, and thus, good tea drink hygiene can be maintained. Further, the powdered tea 1 has a small average particle size. When brewing the powdered tea 1 in the high temperature and high pressure brewing machine 2 to make a hot tea drink at a high temperature and a high pressure, the large contact surface area between the powdered tea 1 and hot water enables of the internal substances of the powdered tea 1 to be fully and rapidly released, and thus, a small amount of the powdered tea 1 can make a large volume of hot tea drink.

Further, when an operator is going to sell the cold tea drink, the operator does not need to brew a large amount of the powdered tea 1 into a hot tea drink. The operator simply needs to take a proper amount of the powdered tea 1 according to the client's order and then to pour the powdered tea 1 into the high temperature and high pressure brewing machine 2 for brewing with hot water to make a hot tea drink, enabling the hot tea drink thus made to be cooled down by the beverage cooling device 3 to become a cold tea drink. Because the operator does not need to brew a large amount of the powdered tea 1 in advance, avoiding waste of unsold residual tea drink.

Figure 7:
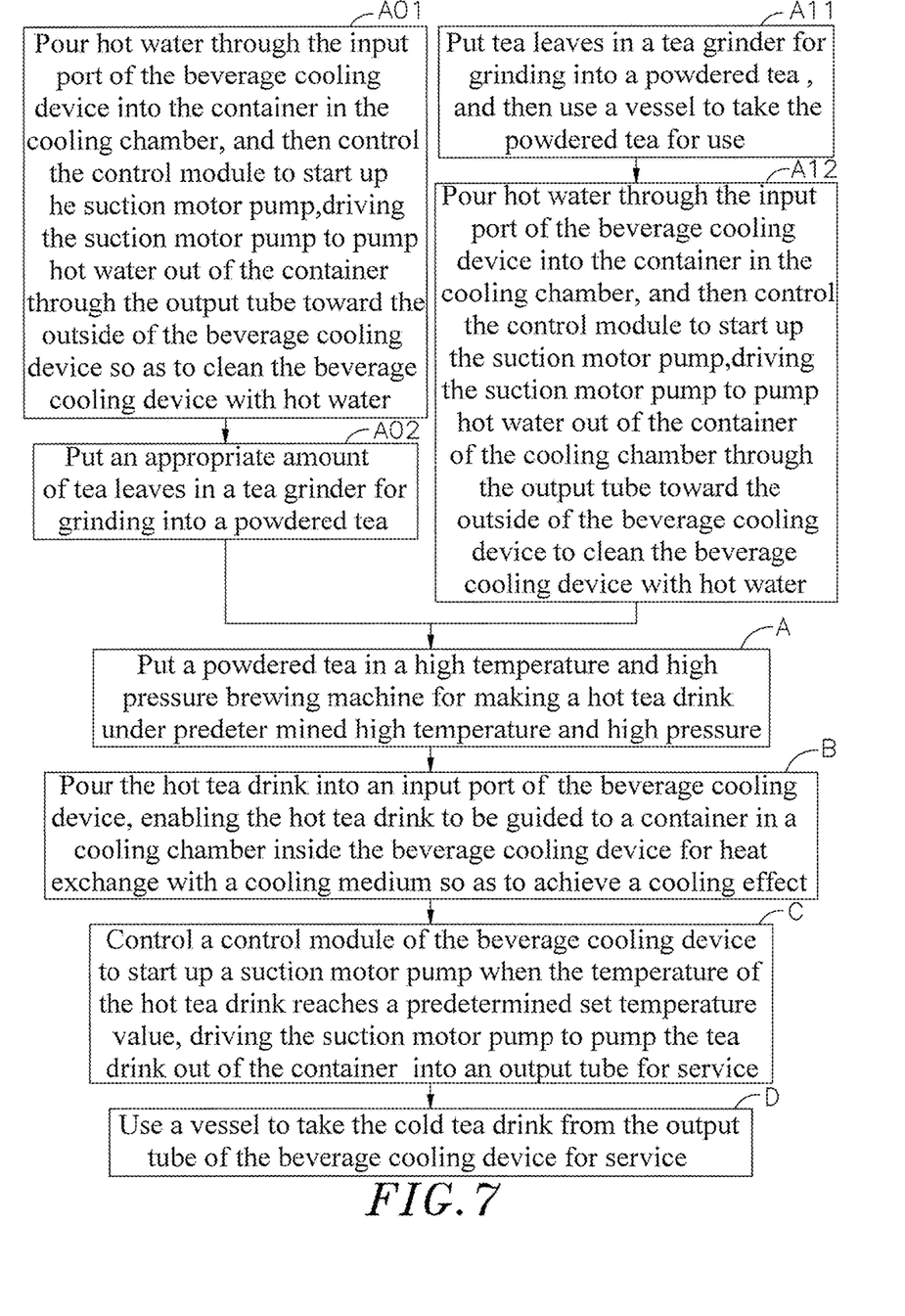
FIG. 7 is a detailed flow chart of the tea drink preparation method in accordance with the present invention.
Figure 8:
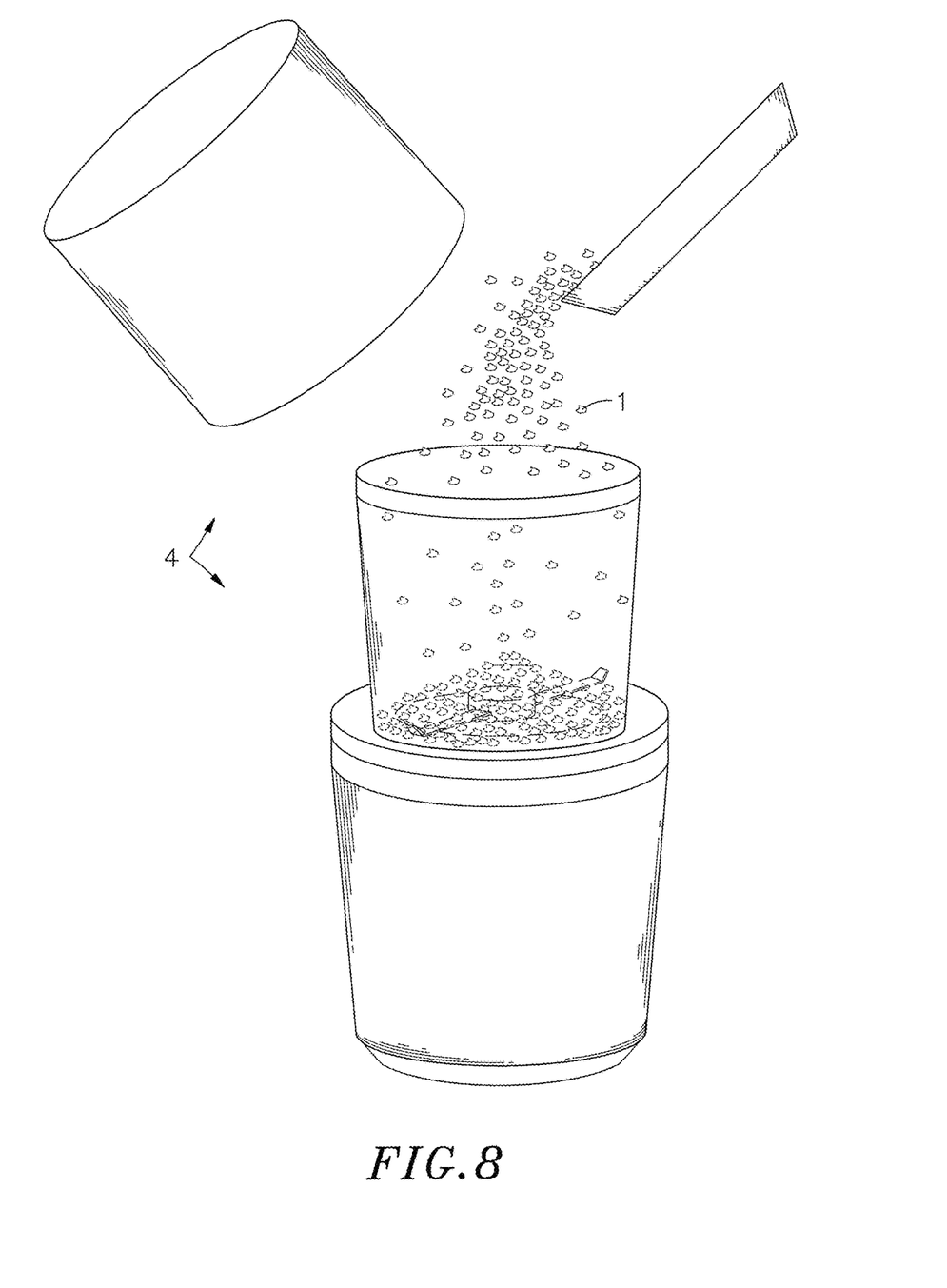
FIG. 8 illustrates tea leaves put in a tea grinder for grinding into a powdered tea in the process of the tea drink preparation method in accordance with the present invention.

Referring to FIGS. 7 and 8 and FIGS. 5 and 6 again, prior to above-described step (A), the tea drink preparation method further comprises the pre-steps of:

(A01) Pour hot water through the input port 31 of the beverage cooling device 3 into the container 321 in the bottom side of the cooling chamber 32, and then switch on the switch 332 of the control module 33 to start up the suction motor pump 34, driving the suction motor pump 34 to pump hot water out of the container 321 in the bottom side of the cooling chamber 32 through the output tube 35 toward the outside of the beverage cooling device 3 so as to clean the beverage cooling device 3 with hot water.

(A02) Put an appropriate amount of tea leaves in a tea grinder 4, then turn on the tea grinder 4 to grind the tea leaves into a powdered tea 1, and then take the powdered tea 1 out of the tea grinder 4 for putting into the high temperature and high pressure brewing machine 2 for brewing.

Further, in an alternate form of the present invention and the prior to above-described step (A), the tea drink preparation method further comprises the pre-steps of:

(A11) Put an appropriate amount of tea leaves in a tea grinder 4, and then turn on the tea grinder 4 to grind the tea leaves into a powdered tea 1, and then use a vessel to hold the powdered tea 1 thus obtained for application.

(A12) Pour hot water through the input port 31 of the beverage cooling device 3 into the container 321 in the bottom side of the cooling chamber 32, and then switch on the switch 332 of the control module 33 to start up the suction motor pump 34, driving the suction motor pump 34 to pump hot water out of the container 321 in the bottom side of the cooling chamber 32 through the output tube 35 toward the outside of the beverage cooling device 3 to clean the beverage cooling device 3 with hot water, and then use a spool to pick up a predetermined amount of the powdered tea 1 from the vessel and to transfer the taken amount of the powdered tea 1 to the high temperature and high pressure brewing machine 2 for brewing.

Further, with respect to the technique how the tea grinder 4 grinds the tea leaves into a powdered tea 1, as the details of this technique are of the known art and not within the scope of the present invention, it is not considered necessary to repeat them herein.

The operator or user can employ steps (A01) and (A02) before starting step (A). When received an order from a client, the operator or user can pick up an appropriate amount of tea leaves and then use the tea grinder 4 to grind the tea leaves into a powdered tea 1, enabling the powered tea 1 to be brewed and then cooled down for service. This continuous tea drink preparation procedure can effectively maintain the original flavor of the tea leaves. If the operator or user select to employ steps (A11) and (A12) before starting step (A), the operator or user can use the tea grinder 4 to grind a large amount of tea leaves into a large amount of powdered tea 1 for storage in a can or vessel. Thus, when received an order from a client, the operator or user can pick up an appropriate amount of the powdered tea 1 from the can or vessel for making a hot tea drink using the high temperature and high pressure brewing machine 2, enabling the hot tea drink to be further cooled down by the beverage cooling device 3, reducing client's waiting time.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A tea drink preparation method, comprising the steps of:
   - (A01) pouring hot water through an input port of a beverage cooling device into a container in a cooling chamber, a temperature of said hot water is higher than room temperature, and then operating a control module to start up a suction motor pump, driving said suction motor pump to pump the hot water out of said container in said cooling chamber through an output tube toward the outside of said beverage cooling device so as to clean said beverage cooling device with the hot water;
   - (A02) using a tea grinder to grind an appropriate amount of tea leaves into a powdered tea for brewing;
   - (A) putting the powdered tea into a high temperature and high pressure brewing machine to brew said powdered tea with hot water at a predetermined temperature and a predetermined pressure so as to make a hot tea drink, a temperature of said hot water is higher than room temperature and a temperature of said hot tea drink is higher than room temperature;
   - (B) using a vessel to hold said hot tea drink and then pouring said hot tea drink into the input port of the beverage cooling device to the container in the cooling chamber inside said beverage cooling device for heat exchange with a cooling medium in said cooling chamber around said container, enabling said hot tea drink to be cooled down to become a cold tea drink;
   - (C) operating the control module of said high temperature and high pressure brewing machine to start up the suction motor pump of said high temperature and high pressure brewing machine, when the temperature of said hot tea drink has been lowered to a predetermined set temperature value, driving said suction motor pump to pump said cold tea drink out of said container into said output tube of said high temperature and high pressure brewing machine for service; and
   - (D) using a vessel to take said cold tea drink from said output tube of said beverage cooling device for service.

2. The tea drink preparation method as claimed in claim 1, wherein said powdered tea is selected from the group of powdered green tea, powdered black tea and powdered oolong tea.

3. The tea drink preparation method as claimed in claim 1, wherein said control module of said beverage cooling device comprises a display panel for displaying the temperature of said cold tea drink in said container.

4. The tea drink preparation method as claimed in claim 1, wherein said control module of said beverage cooling device comprises a switch operable to switch on/off said suction motor pump.

5. The tea drink preparation method as claimed in claim 1, wherein said predetermined set temperature value in step (C) is in the range of 20° C.~10° C.

6. A tea drink preparation method, comprising the steps of:
   - (A11) using a tea grinder to grind an appropriate amount of tea leaves into a powdered tea, and then using a vessel to hold said powdered tea for brewing;
   - (A12) pouring hot water through an input port of a beverage cooling device into a container in a cooling chamber, a temperature of said hot water is higher than room temperature, and then operating a control module to start up a suction motor pump, driving said suction motor pump to pump the hot water out of said container through an output tube toward the outside of said beverage cooling device to clean said beverage cooling device with the hot water;
   - (A) putting the powdered tea into a high temperature and high pressure brewing machine to brew said powdered tea with a hot water at a predetermined temperature and a predetermined pressure so as to make a hot tea drink, a temperature of said hot water is higher than room temperature and a temperature of said hot tea drink is higher than room temperature;
   - (B) using a vessel to hold said hot tea drink and then pouring said hot tea drink into the input port of the beverage cooling device to the container in the cooling chamber inside said beverage cooling device for heat exchange with a cooling medium in said cooling chamber around said container, enabling said hot tea drink to be cooled down to become a cold tea drink;
   - (C) operating the control module of said high temperature and high pressure brewing machine to start up the suction motor pump of said high temperature and high pressure brewing machine when the temperature of said hot tea drink has been lowered to a predetermined set temperature value, driving said suction motor pump to pump said cold tea drink out of said container into said output tube of said high temperature and high pressure brewing machine for service; and
   - (D) using a vessel to take said cold tea drink from said output tube of said beverage cooling device for service.

7. The tea drink preparation method as claimed in claim 6, wherein said powdered tea is selected from the group of powdered green tea, powdered black tea and powdered oolong tea.

8. The tea drink preparation method as claimed in claim 6, wherein said control module of said beverage cooling device comprises a display panel for displaying the temperature of said cold tea drink in said container.

9. The tea drink preparation method as claimed in claim 6, wherein said control module of said beverage cooling device comprises a switch operable to switch on/off said suction motor pump.

10. The tea drink preparation method as claimed in claim 6, wherein said predetermined set temperature value in step (C) is in the range of 20°C.~10° C.

* * * * *